Jan. 3, 1956 C. L. ESTES 2,729,791

MULTICHANNEL COMMUNICATION

Filed Dec. 27, 1952 2 Sheets-Sheet 1

INVENTOR
CHARLES L. ESTES
BY Percy P. Lantzy
ATTORNEY

Jan. 3, 1956 C. L. ESTES 2,729,791

MULTICHANNEL COMMUNICATION

Filed Dec. 27, 1952 2 Sheets-Sheet 2

INVENTOR
CHARLES L. ESTES
BY Percy P. Lantzy
ATTORNEY 2,729,791

MULTICHANNEL COMMUNICATION

Charles L. Estes, Scottsdale, Ariz., assignor to International Telephone and Telegraph Corporation, a corporation of Maryland Application December 27, 1952, Serial No. 328,220

16 Claims. (Cl. 332—11)

This invention relates to multichannel communication systems and more particularly to an improved sequential coder employed in a pulse code transmission system.

The principles of modulating pulses by signals have been described in detail in the U. S. Patents Nos. 2,262,838 and 2,266,401 issued in the names of E. M. Deloraine et al. and A. H. Reeves, respectively. As explained in these patents, it is not necessary to transmit the variations in amplitude of a signal continuously, but it is sufficient to send discrete pulses, representing amplitude values, spaced at intervals not longer than approximately one-third of the period of the highest signal frequency to be transmitted. These amplitude values may be transmitted as amplitude modulated pulses, frequency modulated pulses, time modulated pulses, or code modulated pulses. Since it is sufficient to send only a small fraction of each signal, the space between the pulses representing this fraction of the signals may be interleaved with pulses of other signals to produce a multichannel pulse wave. If the pulses, or group of pulses in the case of pulse code modulation (PCM), are interleaved in time too close to each other, the interference between the pulses of different channels will occur and produce what is commonly referred to as cross-talk. Such crosstalk is objectionable in all types of multichannel communication systems where substantially distortionless reproduction of the original signal is required.

Pulse code transmission offers marked advantages over the other forms of pulse transmission because of the fact that substantially perfect regeneration can be carried out at a receiving station prior to decoding, or at one or more repeater stations located between the transmitting station and the receiving station. Thus when regeneration is employed, the only significant noise and distortion associated with the signal at the receiver are the noise and distortion which were contributed by the transmitting apparatus.

In PCM transmission the amplitudes of a message wave to be transmitted are sampled at successive instances which are equally spaced in time. Each of these amplitude samples is then translated into a group of on-off pulses termed a pulse code group. A convenient code for this purpose is the six-digit binary permutation code. However, any binary permutation code is capable of representing $2^n$ discrete values, where $n$ is the number of digits in the code. For example, with the six-digit binary permutation code, $2^6$ or 64 different values may be represented. Thus each signal sample, which will have any amplitude of a continuous range from a pre-assigned negative maximum through zero to a pre-assigned positive maximum, is translated in the six-digit binary permutation code into the nearest one of 64 different values. This process is termed quantization, and each quantized value is translated into a unique pulse code group for transmission by circuitry normally referred to as a coder.

The coder is required to set up a pulse code group for each quantized signal value. A great many codes are conceivable, but in practice a simple one, in which the presence and absence of pulses correspond to digits of the binary number system, allows greatest simplicity at the receiver wherein the successive pulse code groups for a particular message signal are translated or decoded into successive quantized amplitude values from which the message signal is reconstructed. Generally speaking, the number of operations and the time required for coding has decreased as the coding devices have been improved and the art of pulse code group has advanced. Rapid coding in the present day multichannel communication system is desirable since it allows more channels to be handled in time division by common equipment.

Channels responsive to different message signals may be multiplexed by arranging them in time sequence, which is commonly referred to as time division multiplex. One means of accomplishing this type of multiplexing is by gating, or switching, at precisely fixed sequentially related times. A substantially rectangular pulse occurring at a fixed predetermined time is impressed on one of the grids of a gate tube so that a signal wave impressed on another grid of said gating tube may be passed during the period of the gating pulse. To avoid crosstalk in a time division system, operations in equipment common to a number of channel signals to be interleaved must proceed without memory of the sampled amplitudes of the preceding signal channels, requiring buildup and decay times of the channel pulses to be confined within extremely strict limits.

Normally the pulse code is delivered by the coder as on-off pulses in time sequence. It is, therefore, natural to organize the code pulse groups of the different channels in sequence, thus forming a time division multiplex. Most types of coders require an appreciable length of time, after delivering the pulses of one channel, to prepare for coding the next channel. This preparation time has heretofore been afforded conveniently, without introducing gaps in the pulse train between assignments of consecutive channels, by providing two coders which take turns coding the sampled amplitudes of the message wave of each channel included in a time division multiplex wave; while one coder is coding a channel pulse, the other coder is being reset or prepared for the next channel pulse.

As the number of channels increases, it is evident that the time interval assigned to each channel must be reduced since all of the channels must be present within one period of a timing wave having a predetermined repetition rate, said timing wave commonly having a repetition rate of 8 kilocycles. Similarly, the allowable duration of a code or digit pulse becomes shorter as the number of time division channels is increased. Also, pulses tend to become more difficult to generate and transmit as their duration decreases.

One object of the present invention is to provide a device for stretching the time period occupied by a group of pulses.

Another object is to provide a relatively high speed coder capable of coding a number of closely interleaved channel pulses in a manner substantially free from distortion due to crosstalk.

Still another object is the provision of a coder which comprises a coding device for encoding the sampled amplitude of a message signal in a fraction of the time normally allotted to a channel included in a time division multiplex signal wave and a means associated with the output thereof to lengthen the code group to correspond in time to the normal time allotment of a multiplexed channel.

A feature of this invention is the provision of a coding device including a PCM coder of the type wherein the sampled amplitude of a message signal is measured by comparison with a set of scaled values. In particular this coding device incorporates an electron beam deflection tube which carries out simultaneously the two functions of quantizing and of coding at a rate controlled by the sweep voltage applied to the horizontal deflection plates thereof, which is substantially greater than the normal rate of coding to assure the production of a code pulse group in a period of time equal to a predetermined fraction of the normal time allotted to a channel incorporated in a time division multiplex signal wave.

Another feature of this invention is the provision of a pulse group stretcher for use with a coder of the type described above. Such a stretcher circuit may comprise a mixer-driver, a delay line with taps disposed thereon in a predetermined manner depending upon the fraction of time in which the code pulse group is formed at the coding device, and a series of keying tubes one for each digit required in a particular binary code. The stretcher circuit is activated by the output of the coding device and is arranged in such a manner that the keying tubes receive energy from predetermined taps of the delay line in a manner to reallocate the time allotment of a code group to the normal time allotted to a channel of a time division multiplex signal wave by extending the spacing between the digit pulse present in a code group.

The above-mentioned and other features and objects of this invention will become more apparent by reference to the following description taken in conjunction with the accompanying drawings, in which.

Figure 1:
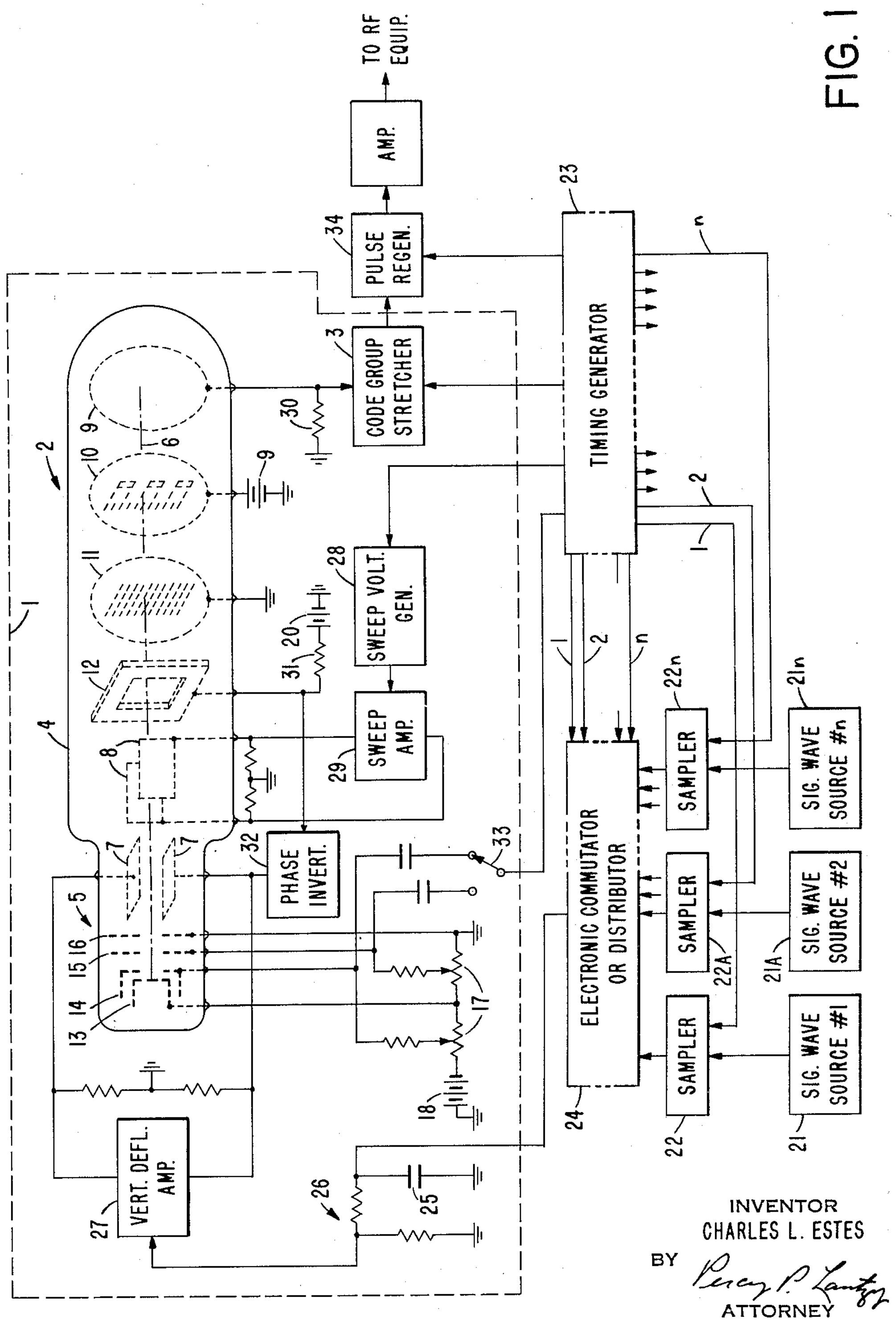
Fig. 1 is a diagram, partly schematic and partly in block, of a PCM transmission system in accordance with the principles of this invention.

Referring to Fig. 1, a pulse code transmission system is illustrated wherein the major portion of distortion present in such a system may be substantially eliminated by removing the possibility of crosstalk existing between adjacent interleaved channels. The transmitter is shown to include a coder 1 comprising a coding device 2 to code sampled pulses in a predetermined fraction of the normal time allotted to a particular channel and a code group stretcher 3 to operate on the output of device 2 in such a manner as to stretch or lengthen the time occupied by the shortened pulse group emitted from device 2 to the normal time allotted to a particular channel in a conventional multichannel communication system.

The coding device 2 may be any known coding device, preferably, however, the coding device 2 comprises an electron beam deflection tube, the basic features of which are discussed in the Bell System Technical Journal for January 1948, pages 1 to 44. Herein this coding device is illustrated as comprising a cathode beam tube 4 including an electron gun 5 for projecting a cathode beam 6, vertical deflection plates 7, horizontal deflection plates 8, a collector anode 9, a coding mask 10, a quantizing grid 11, and a second electron collector 12. The electron gun 5 may comprise a cathode 13, a control electrode or grid 14, focusing electrode 15 and accelerating electrodes 16 which may be supplied with operating potentials by connection to a voltage divider 17 energized by a source 18 in a conventional manner. The anode 9 and the grid 11 may be grounded. The mask 10 is maintained at an elevated potential and the collector 12 at an intermediate potential by sources 19 and 20, respectively.

In the operation of this system a channel signal to be encoded may originate from the signal wave source 21 which is repeatedly sampled by a sampling circuit 22 under control of timing generator 23. Channel messages from a plurality of other signal wave sources 21*a*—21*n* are likewise respectively sampled by generators 22*a*—22*n* with each of the sampled pulses from the plurality of channel samplers being applied to electrons commutator or distributor 24 whereby the channel signals are arranged in time sequence by the combined operation of distributor 24 and timing generator 23. Each speech sample is stored on a storage condenser 25 for use in the coding device until the arrival of the succeeding time sequential sample. The resultant condenser voltage is applied by way of voltage divider 26 to the vertical deflection amplifier 27 whose output is applied to the vertical deflection plates 7. The timing generator 23 delivers appropriately timed square pulses for control of a sweep wave generator 28 whose output is applied to the horizontal deflection plates 8 through means of sweep amplifier 29. In the embodiment herein illustrated for the purpose of expansion, the timing of the sweep generator 28 is arranged to be twice the sampling rate of the message signals for each channel, in other words, 16 kc. rather than 8 kc., thereby enabling the carrying out of the principles of this invention.

After vertical deflection of the cathode beam 6 to a desired position at the starting end of a particular aperture row of the coding mask 10 by the channel signal, the beam 6 is swept in a horizontal direction along this aperture row to travel a sequence of current pulses at the collector 9 and, thereafter, of voltage pulses across the output loading resistor 30. By proper arrangement of the apertures of the coding mask 10, these pulses constitute a conventional binary code group of a number of digits or pulse positions equal to the number of columns of apertures in the mask. The present invention is illustrated in terms of a six digit binary code produced by a mask 10 having six columns of information apertures in sixty-four rows, which gives fair fidelity in reproduction. By arranging the timing generator 23 to control sweep generator 28 at twice the normal sweep rate the code pulses comprising a code group at the load resistor 30 will occupy three bauds rather than the normal six bauds, the actual spacing allotted to a single channel signal.

The wires of grid 11 are parallel with the aperture rows of the mask 10, and the spaces between them are aligned with these apertures. Any tendency of the beam 6 to drift off the aperture row along which its sweeps results in impact of the beam on one or another of the grid wires. Secondary electrons ejected from this wire are collected by the collector 12 to form a current through resistor 31. The voltage drop across this resistor is inverted in phase by phase invertor 32 and applied to the vertical deflection plates 7 in such phase as to nullify this drift. The beam 6 may further be blanked or defocused during the return sweep by application of pulses from timing generator 23 to the accelerating or focusing electrode, selection being provided by means of switch 33.

Heretofore it has been the practice to sample the signal wave of a particular channel at a repetition rate of 8 kc. as controlled by timing generator 17. As the number of interleaved channels and the speed of operation increased more and more distortion has been introduced into the transmitted code pulse groups due to crosstalk between adjacent channel signals. As pointed out hereinabove reduction of such crosstalk has been accomplished by employing two coding devices, one coding a channel signal while the other device is being prepared or reset for the succeeding channel signal. The employment of two coding devices obviously requires an increase in deflection amplifiers, sweep generators, and associated D. C. power sources for the proper operation of the extra coding tube devices.

It has been discovered that by employing one coding tube crosstalk distortion is substantially eliminated by operating the device in a period of time equal to a predetermined fraction of the normal time to accomplish the desired coding of a signal channel. The remaining time of the normal channel allotment allows the preparation of the coding device for the succeeding channel signal. This means, however, that the output for each coded channel signal will occupy only a small fraction of the actual time allotted to each channel included in the desired transmitted multiplex signal, thereby leaving unwanted gaps between adjacent channel pulses. To eliminate these gaps and provide full occupancy of the normal channel allotment, I provide a novel code group stretcher 3 at the output of the coding device to stretch or lengthen to a predetermined amount the shortened code pulse group.

Figure 2:
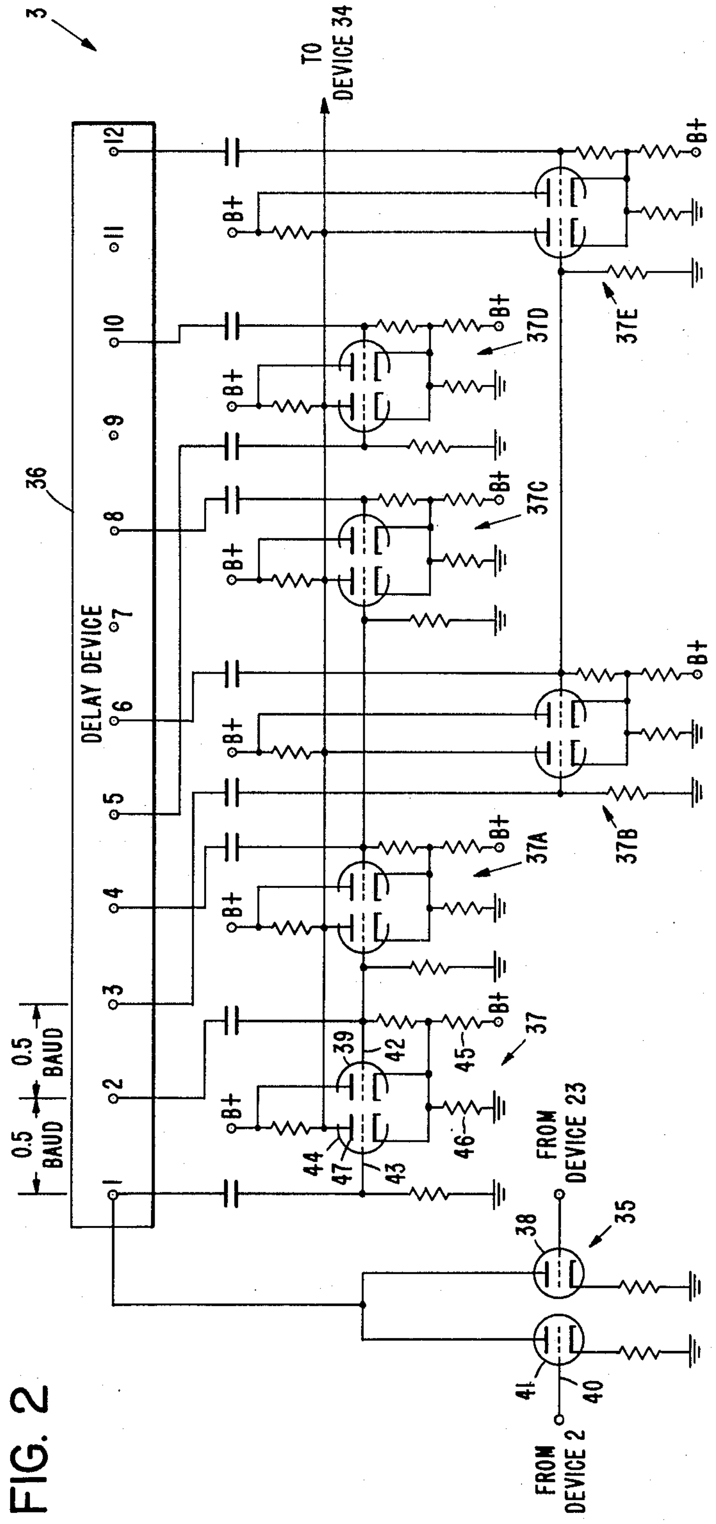
Fig. 2 is a schematic diagram of an embodiment of the code group stretcher employed in the coder of Fig. 1.
Figure 3:
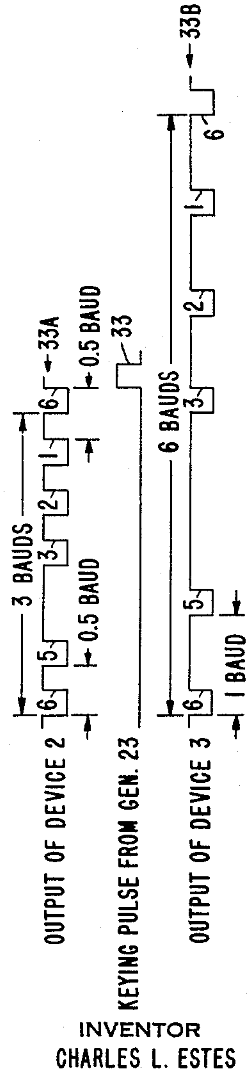
Fig. 3 is a group of curves for assistance in explaining the operation of the invention.

Referring to Fig. 2, an embodiment of code group stretcher 3 is illustrated wherein the coding device 2 completely codes the sampled pulses of a channel in one-half of the normal allotment of time to a channel of a multiplex signal wave. Where a binary code of six digits is employed Fig. 3 illustrates a group of curves wherein the normal six bauds or digit positions are contracted to fit in a three baud space by the operation of coding device 2, thereby allowing three bauds for resetting coding device 2 in preparation for coding the sampled pulse of the succeeding channel. Having established as an example the type of code to be produced by coding device 2 within a predetermined fraction of the normal channel of allotment, the embodiment of stretcher 3 illustrated in Fig. 2 is so arranged that the output of coding device 2 will be expanded to the normal six baud time allotment for coupling to pulse regenerator 34 prior to application of the code pulse group to the R.-F. equipment for transmission to a distant receiver.

The circuit of stretcher 3 consists of a two-stage mixer-driver 35, a delay line 36 having taps sequentially disposed every one-half baud therealong, and a series of keying tubes 37—37*e*, one keying tube per digit position of the selected binary code, so arranged as to expand the pulse code group emitted from device 2 to the normal channel time allotted.

Code stretcher 3 operates substantially in the following manner. A positive keying pulse 33 coupled from timing generator 23 to electron discharge device 38 of the mixer-driver 35 in a manner to substantially precede the first code pulse by one-half a baud. The application of keying pulse 33, illustrated in Fig. 3, activates discharge device 38 in a manner to send a negative pulse down delay line 36. As this pulse passes taps 2, 4, 6, 8, 10, and 12, it gates on the lefthand portion of the successive keying tubes 37—37*e* by cutting off the righthand portion of the electron discharge devices, such as device 39, thereby making ready the keying tubes for receipt of the appropriate coded pulses. Negative code pulses from device 2, as illustrated by curve 33*a*, are fed into the grid 40 of discharge device 41 resulting in a series of positive code pulses on the line 36.

With the predetermined time sequence existing between the keying pulse 33 and the first pulse of the code group it is obvious that the pulse 33 reaches tap 2 coincident with the arrival of the first digit pulse at tap 1. Therefore, with the pulse 33 at tap 2 being applied to grid 42 of discharge device 39 and the coincident arrival of the first digit pulse at grid 43 of electron discharge device 44, an output pulse wil be produced at the anode 45 of discharge device 44. As illustrated the anodes of the lefthand discharge device of keying tubes 37—37*e* are connected commonly to pulse regenerator 34. As the pulse 33 proceeds down line 36 and reaches tap 4, the second digit pulse will have reached tap 2 thereby producing an output at the anode of the lefthand portion of keying tube 37*a*. The remaining keying tubes 37*b*—37*e* operate in substantially the same manner to produce an output pulse in accordance with successive digits of the code signal for application to regenerator 34. Thus by the arrangement of the taps coupling the pulse 33, to the righthand portion of the keying tubes 37—37*e* and the proper coupling of the appropriate pulse of the code pulse group to the appropriate keying tubes from delay line 36, a means is provided to expand the code pulse group originally occupying three bauds to occupy the normal six bauds, as illustrated in curve 33*b* of Fig. 3, needed to properly utilize the conventional R.-F. equipment for transmission to a distant receiver.

Referring to keying tube 37 details of the plurality of keying circuits will become clearer from the following discussion. Electron discharge device 39 is normally conducting and electron discharge device 44 is maintained well below cut-off even in the presence of a positive code pulse by means of the tube current plus the current arriving from B+ by way of resistor 45 passing through the common cathode resistor 46. When the keying pulse 33 arrives at the predetermined delay line tap, discharge device 39 is cut-off and discharge device 44 is brought up to cut-off. The arrival of a positive code pulse at the appropriate tap is now enabled to cause conduction in discharge device 44 and thereby produce a negative output pulse at anode 47. Therefore, the existence of both a code and keying pulse is necessary to produce output in any one of the identical keying devices.

In the curves shown in Fig. 3, the code pulses are illustrated to be one-quarter baud long and could be conceivably lengthened if desired to a length of one-half baud without interfering with the operation of the stretcher, since the stretcher does not function to lengthen a code pulse itself but functions to stretch the time intervals between pulses of a group. In other words, the pulses of a given group are delayed different amounts according to the respective positions of the pulses in the group. The circuit outlined hereinabove may be extended to operate with any number of digits by employing a delay line of sufficient length and appropriately connecting thereto the required number of keying devices. Stretching by a factor different from two is also possible. In this case the grids activated by the pulse 33 are still fed from taps one baud apart but the grids activated by the code pulses are fed from taps spaced a distance apart equivalent to the time interval between the code pulses from coding device 2.

While I have described above the principles of my invention in connection with specific apparatus, it is to be clearly understood that this description is made only by way of example and not as a limitation to the scope of my invention as set forth in the objects thereof and in the accompanying claims.

I claim:

1. A device for stretching the time period occupied by a given group of pulses, comprising a delay device having a plurality of output taps spaced therealong, means to apply a given group of pulses to said delay device, keying means coupled to successive ones of said output taps to render said output taps normally non-conductive, and means to key said keying means coupled to predetermined ones of said output taps to render said output taps conductive in coincidence with successive pulses of said pulse group so that the pulses of said group are delayed different amounts according to their respective positions in said group.

2. A device according to claim 1, wherein said keying means includes normally non-conductive electron discharge devices coupled to successive ones of said output taps and said means to key includes normally conductive electron discharge devices coupled to said normally non-conductive devices to control the conduction thereof in a time sequence proportional to the digit spacing of said pulse group.

3. A device according to claim 2, wherein said means to key further includes means for applying a keying pulse to said delay device and means coupling said keying pulse to an electrode of each of said normally conductive electron devices from a predetermined one of said output taps.

4. A multichannel transmission system comprising a signal coding device, a plurality of message signal sources, a timing source associated with said message sources and said coding device to sequentially time the sampling of said message sources and the operation of said coding device to produce a plurality of time interleaved code pulse groups; characterized in that the coding device produces each code pulse group for occupancy of a predetermined fraction only of the time allotment therefor, the remaining fraction of the group allotment being provided for the resetting of said coding device prior to coding a succeeding channel, and a pulse group stretcher associated with the output of said coding device to expand the digit spacing of said pulse code group in a predetermined manner for occupancy by said code group of substantially all of said time allotment.

5. A multichannel transmission system comprising a signal pulse coder, a plurality of message signal sources, a timing source coupled to said message sources and said coder to sequentially time the sampling of said message sources and the operation of said coder to produce a plurality of time interleaved code pulse groups, said coder including a coding device activated by the sequentially sampled message pulses and said timing source in a manner to code each of said sampled message pulses in a predetermined fraction of the total time allotment of a channel included in the multichannel signal wave, the remaining fraction for each channel allowing the resetting of said coding device prior to coding the succeeding channel, and a code group stretching device coupled to the output of said coding device and said timing source in a predetermined manner to expand the digit spacing of said pulse code group for occupancy by said code group of substantially the entire time allotment per channel of said multichannel signal wave.

6. A system according to claim 5, wherein said coding device comprises an electron beam deflection coding tube, the horizontal sweep thereof being controlled by said timing source to sweep at a predetermined rate greater than the repetition rate of the sampled message signals of each channel applied thereto.

7. A system according to claim 5, wherein said code group stretcher comprises a mixer-driver device, a delay device coupled to the output of said mixer-driver device, said delay device having taps disposed therealong separated by a predetermined fraction of a conventional baud spacing, a plurality of keying devices equal in number to the digits contained in a given code group coupled to appropriate ones of said taps to expand the predetermined condensed pulse code group to the conventional baud spacing of such a code group, and means for keying said keying devices in timed relation to the arrival at corresponding delay taps of successive digit pulses of said code group.

8. A system according to claim 7, wherein said keying devices comprise an electron discharge device having a first section and a second section, each of said sections including at least an anode, a cathode, and a control grid, said cathodes of said sections having a common cathode resistor, and the output of said discharge device being coupled to the anode of said first section, said second section being normally conductive and said first section being held normally non-conductive by the conduction of said second section, said device being keyed by blocking conduction of said second section.

9. A system according to claim 8, wherein said delay device comprises a delay line having a predetermined electrical length with taps spaced therealong separated by a predetermined fraction of a conventional baud spacing, a keying pulse from said timing source being applied to said delay line prior to the first pulse of said code pulse group to sequentially trigger said second section into nonconduction thereby enabling said first section to sequentially space the appropriate ones of the pulses of said code pulse group in a manner to form a combined output at the anodes of the first sections of said keying devices.

10. A system according to claim 9, wherein said taps are spaced said predetermined fraction of a conventional baud spacing with said first section being coupled to said taps spaced a distance equivalent to said predetermined fraction of a conventional baud spacing apart and said second section being coupled to said taps spaced one conventional baud spacing apart.

11. A system according to claim 5, wherein said coding device comprises an electron beam deflection coding tube, the horizontal sweep thereof being controlled by said timing source to sweep at a rate twice the repetition rate of the sampled message signals of each channel applied thereto.

12. A system according to claim 5, where said code pulse stretcher includes a delay line of appropriate electrical length having taps disposed therealong separated by one-half a conventional baud spacing, and a plurality of coincidently operated keying devices equal in number to the digits of a given code group coupled to the appropriate ones of said taps to expand the condensed code pulse group to the conventional baud spacing of such a code pulse group.

13. A system according to claim 12, wherein said keying devices comprise an electron discharge device having a first normally non-conductive section coupled to certain ones of said delay taps and a second normally conductive section coupled to others of said delay taps, said first and second sections having a common cathode connection, said timing source applying a keying pulse to said delay line one-half baud prior to the occurrence of the first pulse of said code pulse group to sequentially render said second section non-conductive and said first section conductive through means of said common cathode connection thereby passing appropriate ones of the pulses of said code pulse group to acquire the new spacing within said code pulse group through the appropriate arrangement of said delay taps, said taps associated with said first section being spaced a distance of one-half a conventional baud spacing apart and said taps associated with said second section being spaced a distance of one conventional baud spacing apart.

14. A binary pulse coder of the type described comprising a coding device of the electron beam deflecting type operated at twice the sampling repetition rate to form a code pulse group in one-half the time allotment per channel in a multichannel signal wave and a code group stretcher coupled to the output of said coding device to expand the digit spacing of the condensed code pulse group for occupancy by said pulse group of said time allotment.

15. A coder according to claim 14, wherein said code group stretcher includes a delay line of appropriate electrical length, dependent upon the number of digits included in a given binary code and the spacing between successive pulses of said condensed code pulse group, having sequentially disposed therealong delay taps spaced by one-half a baud, and a plurality of keying devices equal in number to the digits included in said given binary code coupled to predetermined ones of said delay taps for cooperation in expanding the digit spacing of said condensed code pulse group and means for keying said keying devices in timed relation to the arrival at corresponding delay taps of successive digit pulses of said code group.

16. A coder according to claim 15, wherein said keying devices comprise a normally non-conductive electron discharge device coupled to certain ones of said delay taps and a normally conductive electron discharge device coupled to others of said delay taps, said normally non-conductive devices and said normally conductive devices having a common cathode resistance and a common high voltage anode source, means to apply to said delay line a keying pulse one-half baud prior to the occurrence of the first pulse of said condensed code pulse group to sequentially render said normally conductive device non-conductive and said normally non-conductive device conductive through means of said cathode resistance thereby allowing the passage of the appropriate sequential pulses of said condensed code pulse group to provide the desired digit spacing by proper arrangement of said delay taps, said delay taps coupled to said normally non-conductive device being spaced a distance of one-half a baud and said delay taps coupled to said normally conductive device being spaced a distance of one baud.

References Cited in the file of this patent

UNITED STATES PATENTS

| | | |
|---|---|---|
| 2,577,141 | Mauchly et al. | Dec. 4, 1951 |
| 2,596,199 | Bennett | May 13, 1952 |
| 2,609,529 | Lesti | Sept. 2, 1952 |
| 2,635,229 | Gloess et al. | Apr. 14, 1953 |
| 2,640,965 | Ealesfield | June 2, 1953 |